Nov. 10, 1931.  E. WEISKER  1,831,152
METHOD AND APPARATUS FOR ILLUMINATING OBJECTS TO BE REPRODUCED
Filed June 18, 1926  3 Sheets-Sheet 1
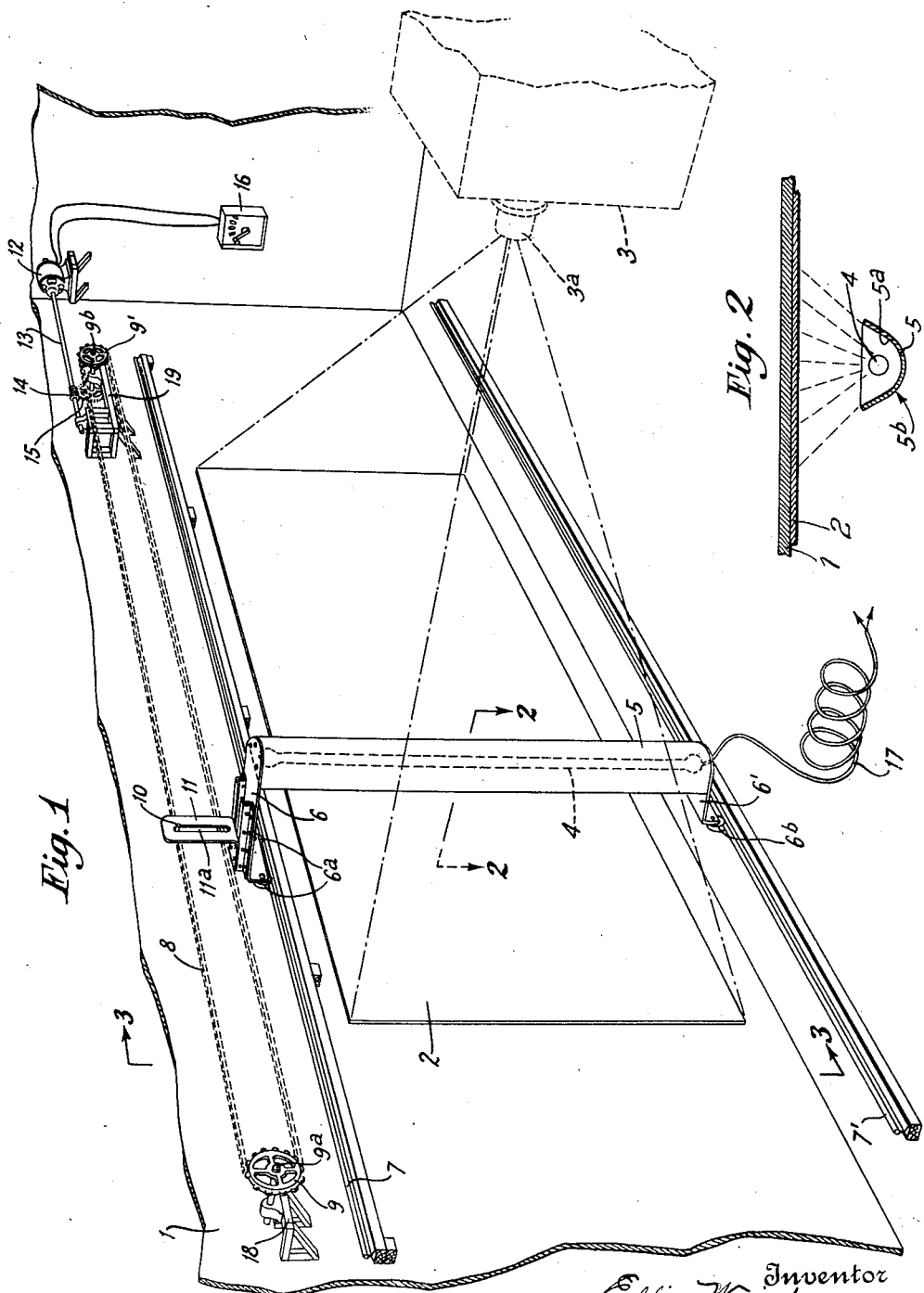
Inventor
Ellis Weisker
By his Attorney
Joseph F. O'Brien Nov. 10, 1931.  E. WEISKER  1,831,152
METHOD AND APPARATUS FOR ILLUMINATING OBJECTS TO BE REPRODUCED
Filed June 18, 1926   3 Sheets-Sheet 2
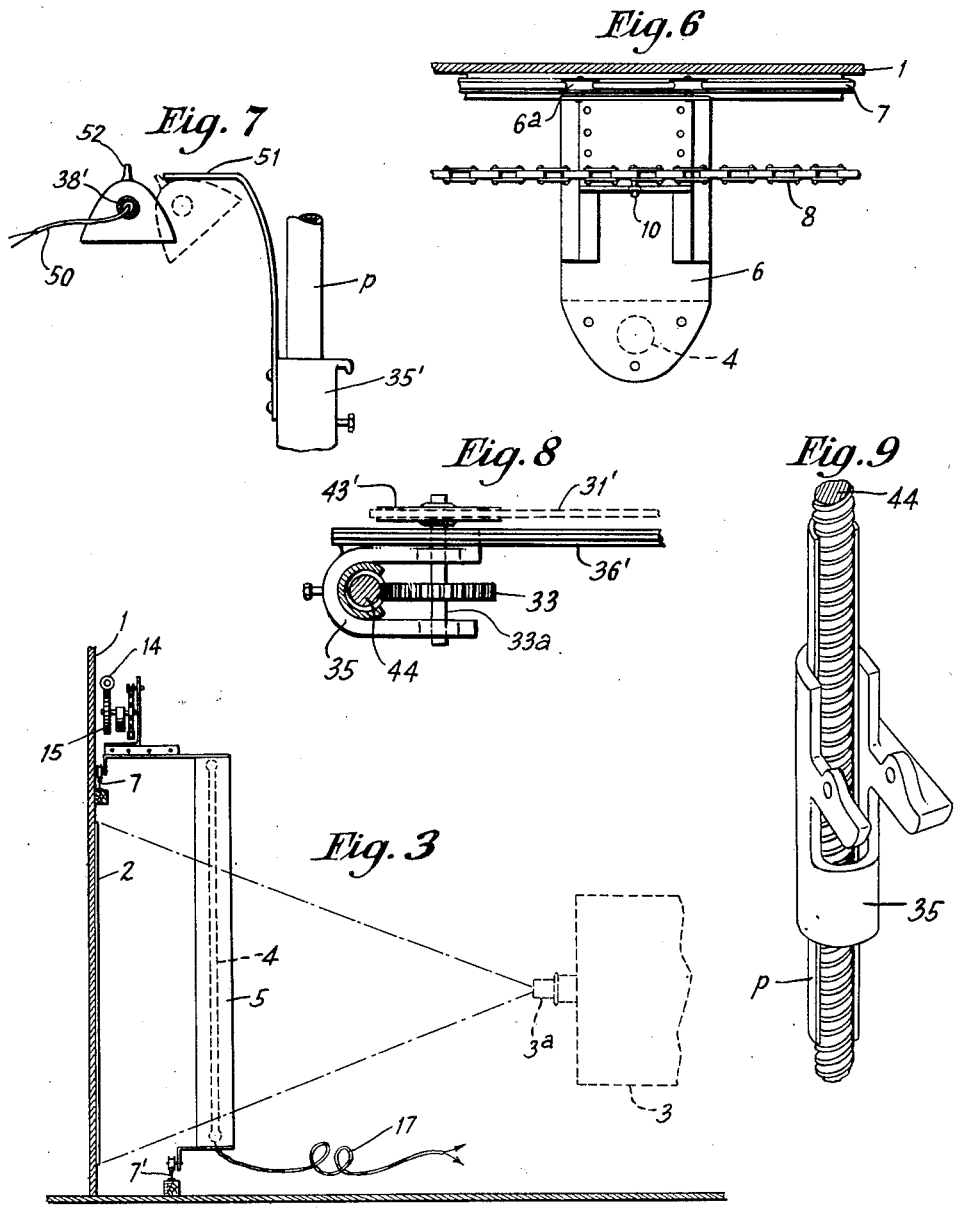
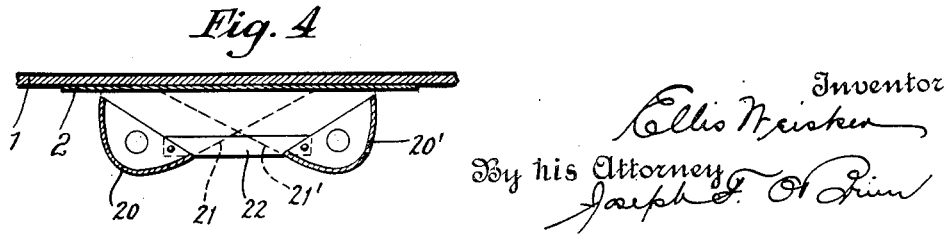

Nov. 10, 1931.　　　　E. WEISKER　　　　1,831,152
METHOD AND APPARATUS FOR ILLUMINATING OBJECTS TO BE REPRODUCED
Filed June 18, 1926　　　3 Sheets-Sheet 3
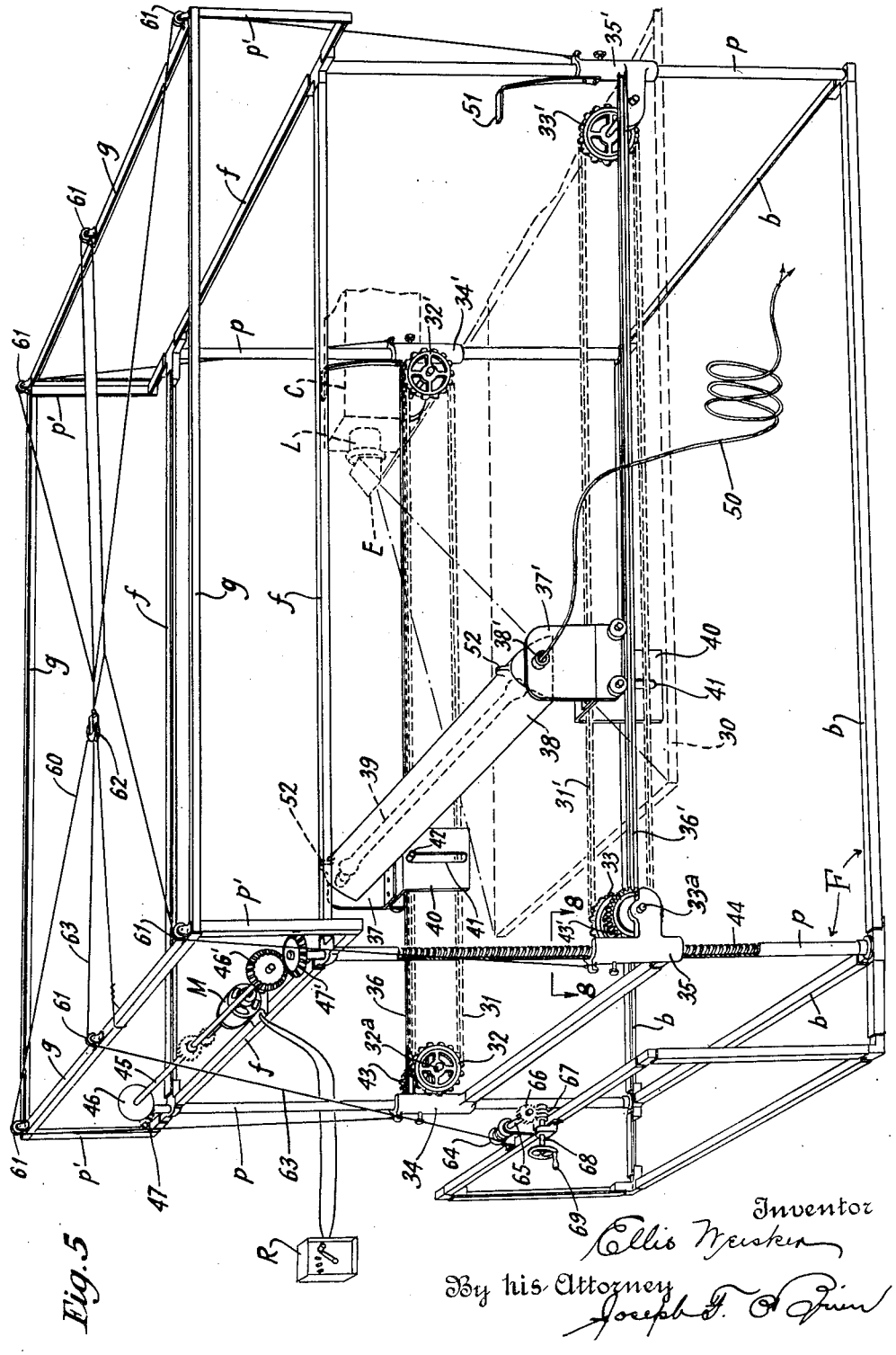

Patented Nov. 10, 1931

1,831,152

UNITED STATES PATENT OFFICE

ELLIS WEISKER, OF BRONX, NEW YORK

METHOD AND APPARATUS FOR ILLUMINATING OBJECTS TO BE REPRODUCED

Application filed June 18, 1926. Serial No. 116,789.

This invention relates to improvements in methods and apparatus for illuminating objects to be reproduced.

One of the objects of this invention is to enable the illumination, with greater uniformity, of flat objects without interfering with the focussing of such objects.

Another object is to provide a novel method and means for illuminating an object to be reproduced photographically or chemically which will not interfere with or prevent ready focussing of such object.

Another object of my invention is to enable ready focussing and illumination by an illuminating element or illuminator of a given power to illuminate, for photographic or like purposes, flat objects of increased dimensions.

Still another object of my invention is to provide a photographic reproducing apparatus which will be capable of ready focussing and in which one or more beams or shafts of light are continuously moved over successive sections of the object, preferably by causing an illuminating element or illuminator shielded by a narrow non-photographable strip to be traversed over the object so as to cause its light rays to move over the object to be photographed, preferably with a uniform speed and density.

Another object of this invention is to provide in an apparatus of the character specified an illuminating element having a non-photographic carrier movable between the objective lens and the object to be photographed to illuminate the object by a moving shaft or shafts of light having its source within the range or field of the objective lens.

Another object of the invention is to provide means for varying the speed of travel or movement of the illuminating element to enable more or less light exposure for objects of varying character.

Another object of the invention is to utilize in an apparatus of the character described an illuminating lamp carrier having on one side a light-reflecting surface arranged to reflect the rays of the lamp toward the object and at the opposite side a surface of non-reflecting and nonphotographing character, whereby sections of the object within the range of the lens of the camera may be successively and in a continuous manner illuminated and the entire object photographed.

Still another object of the invention is to produce a horizontally-disposed apparatus of the type specified which may be elevated out of the way when not in use so as to economize space.

With these and other objects in view, the invention comprises the combination of members and arrangement of parts so combined as to co-act and cooperate with each other in the performance of the functions and the accomplishment of the results herein contemplated, and comprises in one of its adaptions the species or preferred form illustrated in the accompanying drawings, in which:—

Fig. 1 is a view, in perspective, of a vertically-disposed apparatus embodying my invention;

Fig. 2 is a section on the line 2—2 of Fig. 1, looking in the direction of the arrow;

Fig. 3 is a section on the line 3—3 of Fig. 1, looking in the direction of the arrow;

Fig. 4 is a sectional view similar to Fig. 2 of a modified form of lamp carrier adapted for use in connection with the apparatus shown in Fig. 1.

Fig. 5 is a view, also in perspective, showing a modified form of my invention illustrating a horizontally-disposed embodiment thereof;

Fig. 6 is a fragmentary view, in plan, of the carrying mechanism for the travelling illuminating member;

Fig. 7 is a fragmentary detail view of the lamp tilting utilized at the end of the machine illustrated in Fig. 5;

Fig. 8 is a section on the line 8—8 of Fig. 5, looking in the direction of the arrow; and Fig. 9 is a fragmentary view, in perspective, of the elevating and lamp-traversing means.

The drawings illustrate preferred embodiments of my invention, one being a vertically arranged apparatus and the other a horizontally-arranged device.

I will first describe the vertical device shown in Figs. 1 to 3 and then describe the horizontal machine.

Referring now to Figs. 1 to 4 of these drawings, 1 indicates the wall of a building or plant in which I mount my improved apparatus and 2 indicates a copy-bed or copy-board mounted in vertical position on said wall and 3 indicates a conventional camera having a lens-mounting carrier 3ª provided with an objective lens, not shown, the camera being suitably arranged in reference to the copy-board to permit rays of light reflected therefrom to be received by said objective lens within a given radius.

Great difficulty has heretofore been encountered in providing practical means for the proper illumination of objects of large dimensions over the entire field or radius of a relatively large camera lens and which will enable the ready focussing of said lens and thus permit accurate photographic reproductions of the object to be made. With the conventional stationary illuminating lamps heretofore used, the object may be readily focussed, but it has been found practically impossible to properly illuminate for copying purposes an object such as a map or the like of large dimensions, notwithstanding the fact that the range, field or radius of the objective lens would be sufficient to reproduce the image if the object were properly lighted. On the other hand, when a moving illuminating element was used, the object was, except for a narrow section illuminated through a slot in a cover-board, completely covered and obscured so that it was impossible to focus the lens without shifting the covering board and it was necessary to shift this cumbersome cover-board to opposite sides of the object in order to illuminate the same through the slot therein. Every change of the object heretofore required a shifting or manipulation and adjustment either of a series of lights to suit the particular object to be reproduced or photographed or a cumbersome cover-board was necessarily removed and the object illuminated for focussing. In the first case, a plurality of lamps of high power were required to illuminate an object of large dimensions and even then it was impossible to illuminate the different parts of the object uniformly and consequently it was difficult to procure accurate reproductions of the objects to be reproduced or copied, while in the second case, the removal for focussing of the cumbersome lamp-carrying cover-board, the disposition of additional lighting elements for focussing and the subsequent traversing of the said cover-board for copying was equally objectionable. In order to overcome these difficulties, I have taken advantage of the fact that a relatively narrow black or dark-colored object may be interposed between the camera-lens and object because it does not reflect light rays and will not therefore be photographed when moved across the object and between the object and the objective lens. I have, therefore, utilized a lamp mounted in a lamp-shielding element which will not interfere with the focussing of the object. This shield embodies a relatively narrow opaque shade provided with a surface facing the objective lens of such non-light-reflecting and non-photographing type, and I cause this lamp or source of light so shielded to be moved so as to traverse a beam or beams of light over the object to be photographed and between it and the objective lens of the camera, thus providing a moving shaft of light or illumination which will successively cover all sections or portions of the object without obscuring such object or interfering with the focussing of the lens in relation thereto. By illuminating these sections successively, I am enabled to uniformly illuminate the entire object, it being apparent that this could not be accomplished with, for example, a series of stationary lamps over the object and that the focussing could not be accomplished if the major portion of the board be obscured from the lens of the camera.

In successively illuminating succeeding sections of the object, by a continuously-moving beam or shaft, it will be understood, in view of the fact that only the travelling shaft, beam or illuminated section will act on the sensitized film or paper the outer surface of the lamp-carrier being made of dark or black material which will not reflect light waves and which will not cause an image to be reproduced when it comes between the photographic lens and object, the lamp or source of light may be positioned quite close to the object so as to procure the full intensity and it will also be obvious that by varying the speed with which the lamp-carrier moves I will be enabled to subject the entire object to any suitable period of light exposure that may be necessary for the purpose of bringing out in the reproduction or copy the lines on the object and, furthermore, that by varying the speed of movement of the lamp carrier over varying parts of the object, I will be enabled to subject varying parts of such an object to varying degrees of light exposure in accordance with the character of the work to be reproduced, if such varying parts of the object require such varying degrees of exposure.

As illustrated, an illuminating element or source of light 4 comprising a conventional mercury lamp is supported in vertical position parallel to the copy-bed or copy-board 2 in a relatively narrow opaque, lamp-shielding casing 5 having an inner surface 5ª adapted to reflect the rays of the lamp toward the object or copy-board and an outer surface 5ᵇ of non-light reflecting and non-photographing character which shields the lamp-body from the camera lens without in any way interfering with or obstructing the focussing of the camera on the object, and this shielding casing having the lamp or source of light is traversed along the copy-board in a plane parallel with said board and quite closely adjacent thereto so as to procure the benefit of the full intensity of the light on the object. This is accomplished, as shown, by providing said casing with carrier means comprising, as illustrated, movable carrier members 6, 6' having two pairs of wheels $6^a$, $6^b$ running on tracks 7, 7'. Suitable means is provided for mechanically traversing the carrier along the copy-board and in the preferred embodiment shown, I provide, for this purpose, a chain 8 mounted at opposite ends upon pinions 9 and 9' rotating on shafts $9^a$, $9^b$ suitably supported on the wall 1. The chain 8 has projecting at one side of a link thereof a pin 10 engaging a vertically-disposed plate 11 connected with the carrier casing. As illustrated, the projecting pin 10 on the chain 8 engages within a vertical slot $11^a$ in said vertical-extending plate 11, so that when the chain 8 is moved, the projecting pin 10 will propel the carrier members 6, 6' along the tracks 7, 7' and when said projection passes around the periphery of a pinion, the projection will move downwardly in the slot $11^a$ in said plate 11 and will then, when it reaches the lower section thereof, begin to move the carriage in the opposite direction and will continue so to move it while the projection is moving on the lower stretch of the chain and until it reaches the opposite end thereof, when the pin 10 will move upwardly in the slot until it reaches the upper section of the periphery of the pinion and upper stretch of the chain, whereupon it will again propel the carriage and lamp in the opposite direction.

It will be seen that I have thus provided a continuous reciprocating arrangement for the shielded lamp.

Any suitable means may be utilized for rotating the pinions to move the chain, and I preferably utilize a means which may be caused to move the chain with a uniform speed when desired and which may be readily controlled to change the speed in order to procure exposures of varying durations in accordance with the character of the object to be reproduced or copied, or to procure during the photographing of a single object, varying exposures so as to bring out, more clearly, portions of such an object having lines of varying character thereon.

For the purpose of rotating the pinions to move the chain, I preferably provide as illustrated, an electric motor 12, suitably supported, and having a shaft 13 provided with a worm 14 which meshes with a worm wheel 15 on the transverse shaft $9^b$ of the pinions 9'. The pinion-shafts are mounted in bearings supported by bracket frames 18 and 19 attached to the wall. The speed of the motor may be controlled in any suitable manner, and, as shown, I control the same by the use of a variable resistance or rheostat 16.

Suitable means is provided for furnishing current to the travelling lamp and, as illustrated, I have shown a coil of wire 17 which may be connected to any suitable source of current supply, not shown.

In Fig. 4, I have shown a modified form of lamp carrier in which two relatively narrow lamp-screening holders 20, 20' are tilted in opposite directions to cause beams of light 21, 21' to be projected across an open central portion 22. It will be obvious that lamp holders of this type may be provided with carrier means and traversed across the copy-board in substantially the same way as described hereinabove in reference to the lamp holder 5 but that instead of throwing a split beam as in the case of the holder hereinabove described, the modified holder of Fig. 4 will throw double cross beams and it will be apparent that, in this case also, the portion of the object which will act upon the sensitized plate, paper or film will be that portion only which is illuminated by said crossed beams and which reflects the light, and that in this case also the lamp holder being opaque and having a surface facing the objective lens which is non-light reflecting and non-photographable, will not affect such paper, plate or film and will not produce an image nor cause a reproduction thereof to be made on said sensitized element or elements.

In the modified machine shown in Figs. 5 to 9 inclusive, I have illustrated a copy-board 30 suitably supported in horizontal position within a frame F comprising, as shown, a series of base bars $b$ on which are mounted corner posts $p$ connected at their upper ends to elevated frame bars $f$ having a gallery frame $g$ supported by elevated posts $p'$.

As illustrated, chains 31, 31' are mounted at opposite ends on pinions 32, 32' and 33, 33' supported by brackets 34, 34' and 35, 35' slidably mounted on the four upright posts $p$ of the machine frame F.

As illustrated, the pinions 32, 32' and 33, 33' are supported on shafts having bearings in said sliding brackets 34, 34' and 35, 35' and these brackets also support tracks 36, 36' on which are mounted carrier members 37, 37' having pivotally mounted therein a lamp holder or casing 38 in which is mounted a lamp illuminating element or source of light 39.

The holder and lamp are traversed across the copy-board 30 on which may be mounted a suitable object to be copied, such as a large map, by the engagement of a pair of carrier plates 40 having vertical slots 41 with pins 42 on the chains 31, 31'.

The chains are driven, as shown, by providing on the pinion shafts $32^a$, $33^a$ a pair of worm wheels 43, 43' and providing the upright posts $p$ at one end of the frame with worms 44, said worms being rotated to rotate the worm wheels and chain pinions by means of a motor M mounted in elevated position on one of the frame bars $f$ and geared to a shaft 45 having vertical bevelled pinions 46, 46' at opposite ends. These pinions 46, 46' mesh with horizontal bevelled pinions 47, 47' on the posts $p$ so as to turn the worms 44 therein and drive the chain, the lamp 39 and holder 38 being thus traversed in a horizontal position over the copy-board 30 which in this embodiment extends through one end of the frame of the machine. The movements of the pins 42 in relation to the pinions and chains and slot 41 are in all respects similar to that hereinabove described in relation to the embodiment shown in Figs. 1 to 3.

It will be noted that the holder 38 and lamp 39 will be traversed beneath the camera C having the lens-holder L and an erecting prism E which is in all respects similar to the conventional camera lens and prism, and that the lamp is thus traversed so as to intersect the field or range of the objective lens; that the holder is of dark or black color and non-reproducible photographically or chemically as hereinabove described in relation to Figs. 1 to 3 and that this holder will not cause an image nor affect the sensitized paper which, of course, is mounted in a conventional manner common in copying or photostat machines.

It will be seen, furthermore, that the light is moved in a plane parallel to the copy-board, which copy-board may be raised and lowered if desired in the conventional manner now employed in photostat machines.

A suitable source of current supply is also provided. As shown, a loose coil of wire 50 is connected to the lamp 39 through a pivot sleeve 38' and the opposite end of this coil being connected to a suitable source of supply, not shown.

The speed of the motor M may be controlled in any suitable way and, as illustrated, I have shown a resistance box or rheostat R for that purpose.

In some cases it will be desirable to cause a tilting of the lamp at one or both of the opposite ends of its path of travel so as to swing or throw the beam of light beyond the normal limit of movement thereof and in order to accomplish this object I provide on posts a series of tilting elements 51 adapted to engage tilting lugs 52 on the lamp holder 38. Obviously when the lamp holder moves to its extreme position, the lugs 52 will engage the ends of the tilting arms 51 which will swing the holder on the pivots 38' and thus swing the beam of light beyond the normal limit of its travelling movement so as to illuminate or light up an additional section or area of the copy-board.

The results achieved by this embodiment will be substantially identical to those hereinabove described in relation to Figs. 1 to 4 and I preferably also provide means for moving the illuminating element or lamp and lamp-moving mechanism up out of the way when it is desired to free the space occupied thereby for any purpose, as for example the copying with stationary lamps of relatively small objects. The rear end of the frame is left open so as not to interfere with the raising or lowering of the copy-board or the elevation of the lamp-moving mechanism as above specified. For the purpose of so elevating the lamp-moving mechanism, the sliding brackets 34, 34' and 35, 35' are moved upwardly so as to bring the same to the upper end of the posts $p$. To accomplish the movement of the brackets together, I have provided a system of cords 60 having four ends anchored to the four brackets 34, 34' and 35, 35' and passing over a series of stationary pulleys 61 and a floating pulley 62 which is so arranged as to cause a cord 63 passing over the same and anchored to the rail $g$ to exercise a pull on all four ends of the system of strings 60. As illustrated, the string 63 is wound upon a winch 64 mounted on a shaft 65 having a worm wheel 66 meshing with a worm 67 on the shaft 68 turned by a crank handle 69. By turning the handle 69 the cord 63 will be wound up on the winch 64 and a pull will, as aforesaid, be exerted upon the system 60 of cords which will cause a sliding movement of the brackets 34, 34' and 35, 35' to elevate the same to the top of the posts $p$ and thus move the illuminating element and mechanism out of the way and to free the space beneath the same for other work.

Having described my invention, I claim:—

1. An apparatus for illuminating objects to be photographically or chemically reproduced comprising an illuminating element, having a relatively narrow non-reproducible shading surface, an objective, means for traversing said illuminating element and shading surface in a path of movement intersecting the rays of light to the objective, light-reflecting means for directing the rays from said illuminating element on the object, whereby a continuous beam of light will be directed against the object and reflected to the objective lens while the body of the illuminating element will be shaded or shielded by said non-reproducing surface which will not obstruct a focusing of the lens.

2. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, whereby a continuous beam of light will be directed against the object and reflected to the objective lens while the body of the illuminating element will be shaded or shielded by said non-reproducing surface which will not obstruct a focusing of the lens.

3. An apparatus for illuminating objects to be photographically or chemically reproduced comprising an illuminating element having a relatively narrow non-reproducible shading surface, an objective, means for transversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, whereby a continuous beam of light will be directed against the object and reflected to the objective lens while the body of the illuminating element will be shaded or shielded by said non-reproducing surface which will not obstruct a focusing of the lens, and means for tilting said lamp-holder at an opposite extreme of movement to swing its beam of light beyond the normal path of movement thereof.

4. An apparatus for illuminating objects to be photographically or chemically reproduced comprising an illuminating element having a relatively narrow non-reproducible shading surface, an objective, means for shading surface in a path of movement intersecting the rays of light to the objective, light-reflecting means for directing the rays from said illuminating element on the object, said light-moving means comprising a lamp-holder, a carrier movable on tracks in substantially parallel relationship to the object to be reproduced and a conveyor chain having a connection with said carrier for reciprocating the same in opposite directions over said copy-board, whereby a continuous beam of light will be directed against the object and reflected to the objective lens while the body of the illuminating element will be shaded or shielded by said non-reproducing surface which will not obstruct a focussing of the lens.

5. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder, a carrier for said holder movable on tracks in substantially parallel relationship to the object to be reproduced, a conveyor chain, said carrier having a plate provided with a vertical slot and said chain provided with a pin extending therethrough to cause at opposite limits of movement the pin to be raised and lowered in said slot and a reciprocation of the carrier in opposite directions to be produced.

6. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, and means for elevating said illuminating element and carrier mechanism to economize floor space when the machine is not in use.

7. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, a conveyor chain having a connection with said carrier, and electro-magnetic means for driving said chain to move said carrier.

8. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, a conveyor chain having a connection with said carrier, electro-magnetic means for driving said chain to move said carrier, and means for controlling the speed of movement thereof.

9. An apparatus for illuminating objects to be photographically or chemically reproduced comprising an illuminating element having a relatively narrow non-reproducible shading surface, an objective, means for traversing said illuminating element and shading surface in a path of movement intersecting the rays of light to the objective, light-reflecting means for directing the rays from said illuminating element on the object, said light-moving means comprising a lamp-holder and a carrier mechanism therefor movable on tracks in substantially parallel relationship to the object to be reproduced, a conveyor chain having a connection with said carrier, an electric motor for driving said chain and a variable resistance for controlling the speed of said motor.

10. An apparatus for illuminating objects to be photographically or chemically reproduced comprising an objective, a lamp, a non-reproducible shading member interposed between the body of said lamp and the objective, said lamp and shading member directing against the object within the field of view of the objective, a beam of light of gradually increasing intensity, said beam being blocked off from the objective by said shading member at the side of said beam adjacent to the lamp only and varying from highly intense rays at said blocked off side to diffused and subdued rays at the opposite side of said beam, and means for traversing said lamp and shading member through said field of view and over the object to be reproduced.

11. An apparatus for illuminating objects to be photographically or chemically reproduced comprising an objective, a lamp, a non-reproducible shading member interposed between the body of said lamp and the objective, said lamp and shading member dividing the light reflected from the object and reaching the objective from said lamp into a plurality of beams, and means for traversing said lamp and its shading member through the field of view of the objective and over the object to be reproduced, whereby a plurality of travelling beams of light compensating with each other during movement through the said field of the objective will be reflected from the object to the objective lens while the body of said lamp will be shaded or shielded by said non-reproducing surface.

12. An apparatus for illuminating objects to be photographically or chemically reproduced comprising an objective, a lamp, a non-reproducible shading member interposed between the body of said lamp and the objective, said lamp and shading member dividing the light reflected from the object and reaching the objective from said lamp into a plurality of beams, each of said beams varying from highly intense rays to diffused and subdued rays, and means for traversing said lamp and shading member through the field of view of the objective and over the object to be reproduced, whereby a plurality of travelling beams of light each varying from highly intense rays to relatively subdued rays and compensating with each other during movement of the lamp will be reflected from the object to the objective lens, while the body of said lamp will be shaded or shielded by said non-reproducing surface.

13. The method of photographically or chemically reproducing objects consisting in fastening on a plane surface the object to be reproduced, focusing an objective lens to cause its field of view to include said object, taking an illuminating element, traversing the illuminating element over said object within the field of the objective, and so shading the said illuminating element during such traversing movement as to cause the exposure to the objective lens of light produced by said illuminating element composed of both highly intense rays and rays of gradually diminishing intensity.

14. The method of photographically or chemically reproducing objects consisting in fastening on a plane surface the object to be reproduced, focusing an objective lens to cause its field of view to include said object, taking an illuminating element, traversing the illuminating element over said object within the field of the objective, and so shading the said illuminating element during such traversing movement as to cause exposure a plurality of times to the objective lens of light produced from a single illuminating element.

In witness whereof, I have signed my name to the foregoing specification.

ELLIS WEISKER.